Patented Sept. 3, 1946

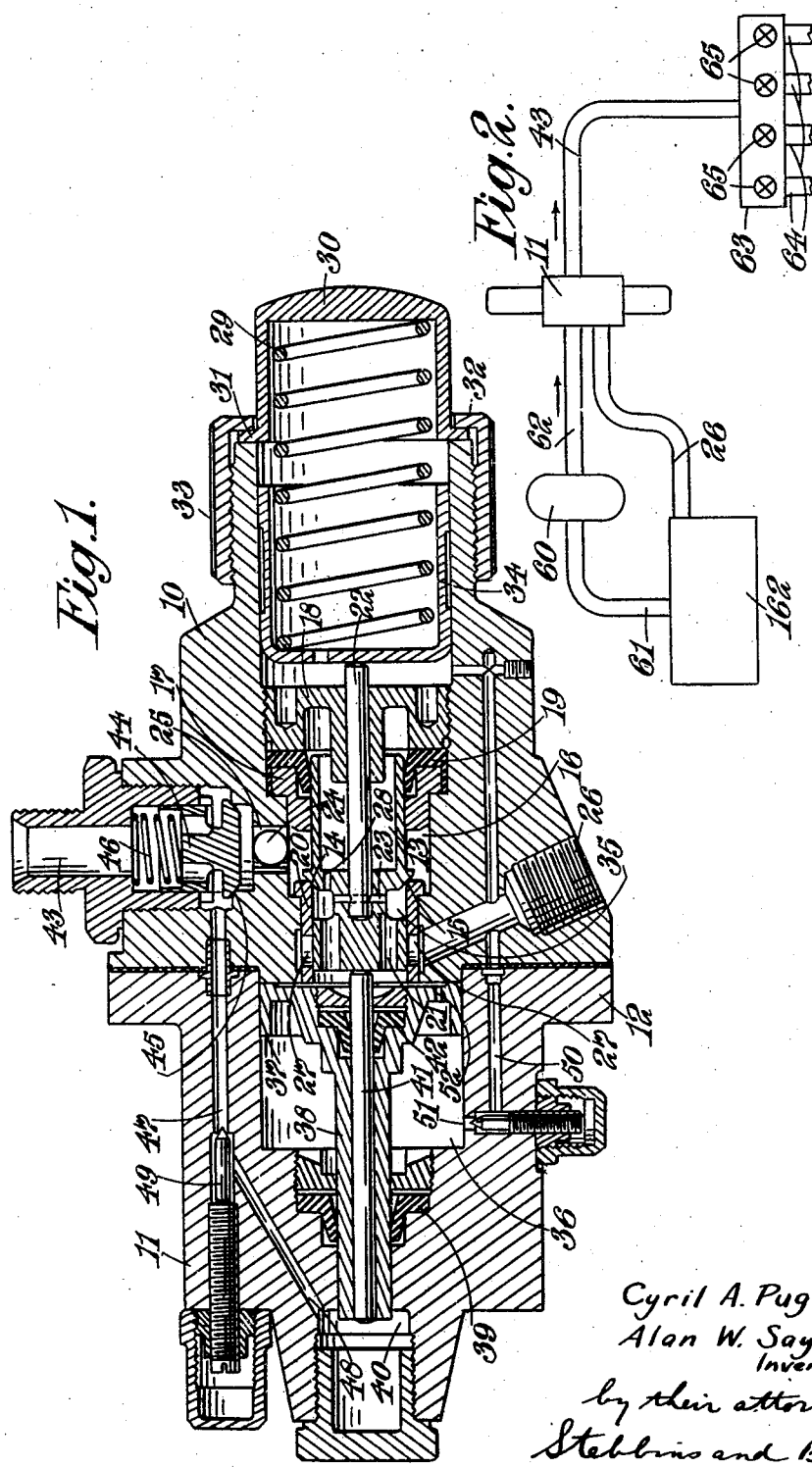

2,406,899

UNITED STATES PATENT OFFICE 2,406,899

HYDRAULIC CUTOUT DEVICE

Cyril Alphonso Pugh, Ilford, and Alan William Say, Upminster, England, assignors to The Plessey Company Limited, Ilford, England, a British company Application July 1, 1943, Serial No. 493,076
In Great Britain July 22, 1942

18 Claims. (Cl. 137—153)

This invention consists in improvements in or relating to hydraulic cut-out devices, that is to say, devices by means of which the flow of fluid in a hydraulic circuit may at required times and under certain conditions be by-passed from the service portion of the system. In particular, the invention relates to a cut-out valve arrangement, and a typical circuit in which such an arrangement is employed comprises a supply tank for hydraulic fluid, and a continuously operating fluid pump which draws fluid from the supply tank and passes it to the service lines via a cut-out device, the by-pass passage of which leads back to the supply tank.

The invention is applied to a cut-out device of the type having a passage leading from the pressure inlet to the service pressure outlet past a non-return valve, and a by-pass valve normally closed by resilient means but adapted to be opened by a plunger entering and acted upon by pressure in a pressure chamber connected to the service pressure side of the system.

A cut-out device having the above combination of features will be referred to in the appended claims as "a cut-out device of the type described."

The requisite functions of a satisfactory cut-out valve are:

(a) to provide for means which will automatically divert the flow from a continuously operating pump into a by-pass circuit when the pressure fluid is not required for operation of a hydraulic service and when a given peak pressure has been attained.

(b) To provide means for automatically redirecting the flow into the operating circuit when a further hydraulic service is selected or is required or when the pressure in that circuit falls below a predetermined minimum.

(c) To maintain a given fluid-pressure in the service line during the periods when fluid is by-passed by the valve so that (i) immediate operation of the fluid is ensured when selection of a service is made, and (ii) pressure in the hydraulic service can be maintained if required.

(d) To provide a low by-pass pressure so that load on the pump is relieved when not required for operation of a hydraulic service.

(e) To provide a valve which will perform functions (a) and (b) above smoothly and without producing hydraulic shock in the system.

(f) To provide the valve performing functions (a) and (b) above in which the difference in the cut-in and cut-out pressures is small.

The foregoing desiderata are all obtained by the present invention which comprises a cut-out device of the type above described which also comprises a pilot valve which is hydraulically balanced with respect to the inlet and by-pass fluid and controls the passage leading from the inlet to a by-pass chamber having a yielding or movable wall, which wall is subjected to pressure within the by-pass chamber, means operatively connecting the by-pass valve with the pilot valve whereby the by-pass valve serves, when the pilot valve is open, to connect the inlet line to the by-pass line through the by-pass chamber, and the operative connection between the two valves is so arranged that the by-pass valve is opened only after initial movement of the pilot valve has admitted fluid past the pilot valve to the by-pass chamber, and a yielding or movable wall for the by-pass chamber to which is operatively connected the plunger, of which one end enters the pressure chamber, whereby as the said wall moves under the pressure of fluid admitted to the by-pass chamber the plunger will serve to increase pressure within the pressure chamber.

Conveniently, the by-pass valve is connected hydraulically or mechanically with the pilot valve.

Both the pilot valve and the by-pass valve operate in mechanical combination with pistons, which enter chambers filled with the hydraulic fluid, either at by-pass pressure, or at service pressure. The motion of these valves is retarded by the insertion of variable leaks in the ducts leading from these chambers to the appropriate exits, and thus smooth operation of these valves is obtained.

The various parts of the invention referred to above may be combined in various ways, so that one part may fulfil more than one function. Thus, for example, the pilot valve and the by-pass valve may be mechanically connected so that one closure spring may serve to close both.

A non-return valve is provided in a passage leading from the inlet passage to the service line or in the service line itself and the pressure chamber is connected to the service side of the non-return valve.

It may be desired further to provide means whereby fluid losses due to leakage in that part of the circuit which is under pressure may be made up during the periods of by-passing so as to avoid frequent unnecessary operation of the cut-out valve. In this case the pressure chamber above referred to, which may be formed of interconnected parts, together with a differential piston, the smaller end of which enters within the pressure chamber and is subjected to the pressure therein, and the larger end of which enters within a part of the by-pass chamber and is subjected to the pressure therein, may be formed to constitute a hydraulic accumulator, which serves to make up fluid losses due to leakage in the service line and allows the by-pass pressure to be maintained lower than the service line pressure. Also, a small leak may be provided allowing communication between the two parts into which the by-pass chamber is divided by the larger end of this piston, providing for withdrawal of the differential piston from the pressure chamber when the pilot valve is closed. Another variable leak is in this latter case provided at the end of that part of the by-pass chamber which is separated from the pilot valve by the large end of the differential piston. This latter variable leak communicates with the by-pass line and it controls the rate of movement of the differential piston under the pressure of the by-pass liquid.

In order that the invention may be more clearly understood a preferred example will now be described with the aid of the accompanying drawing, in which Figure 1 is a central section containing the axis of the pilot and by-pass valves, and Figure 2 is a diagram illustrating in general one use for the device according to the invention.

Like reference numerals indicate like parts in both figures of the drawing.

The valve casing as a whole is formed in two portions 10 and 11 the latter having a flange 12 by which it may be secured to the part 10. The pilot valve 13 is a cylindrical valve having a conical end face 14 for which a seating 15 having the same diameter as the cylindrical portion of the pilot valve 13 is provided at one end of a valve chamber 16 within which valve 13 is slidingly received and in which it operates. At one end of the chamber 16 is a valve bearing or guide 17 between which and an end closure ring 18 a cupleather or other packing 19 is inserted. At the other end, chamber 16 has within it a liner 20 which constitutes a guide for a hollow cylindrical by-pass valve 21 which is secured to and moves with pilot valve 13, both valves being rigidly secured to a common spindle 22 having an area equal to that of rod 41. The cylindrical valve 21 has radial webs connecting it to a central boss in which spindle 22 is secured by means of a cross-pin 23. Inlet and delivery ports 24 and 25 respectively open into chamber 16 at its upper end both on the valve side of seating 15. On the opposite side of that seating a by-pass conduit 26 communicates with ports 27 extending through the guide 20 into the space within the interior thereof. A small passage 28 is formed in valve 13 so as to provide a communication through that passage between the chambers on opposite sides of valve seating 15. Since the area of the valve seat 15 is equal to that of the cylindrical portion of the valve 13, and the area of the spindle 22 is equal to that of the rod 41, the pilot valve acting in association with rod 41 will thus be maintained in hydraulic balance with respect to the inlet and by-passed fluid and the movement of these parts will be influenced only by fluid pressure in the pressure chamber acting on the remote end of rod 41 in opposition to spring 29.

The spring 29 entering the end of casing 10 is held therein by means of a domed cover 30, a flange 31 thereon being engaged by flange 32 of a ring 33 screwthreaded on to an end cylindrical extension of casing 10. The hollow piston-like cover 34 surrounding the opposite end of the spring is held by the latter in engagement with the end of spindle 22 so that pilot valve 13 is normally held on to its seat by the pressure of spring 29.

The axial dimension of by-pass valve 21 is made such that the by-pass chamber 35 (constituted by the interior cavity of guide 20) would not be opened to the by-pass passage 26 until after a predetermined initial movement of pilot valve 13 from its seat 15 has taken place. When, however, valves 13 and 21 have both moved sufficiently to uncover ports 27 the by-pass passage 26 will have been opened to valve chamber 16 so as to by-pass pressure fluid from that chamber into a position of relatively low pressure.

By-pass chamber 35 communicates with another chamber 36, which may be considered as an extension of the by-pass chamber but which is of larger diameter than that of chamber 35. Within chamber 36 is a piston 37 which has a hollow piston rod 38 extending through a packed gland 39 to enter at its opposite end in a pressure chamber 40 which constitutes the pressure chamber referred to at the commencement of this specification as comprising part of the pilot valve-actuating means. Sliding within the hollow piston rod 38 is a rod or piston 41 having an area equal to spindle 22 which at one end is exposed within the pressure chamber 40 and at its other end passes through piston 57 to engage the end of the boss of by-pass valve 21. A packed gland 42 is provided to prevent leakage of fluid between rod 41 and the hollow piston rod 38.

Delivery port 25 communicates with a delivery outlet conduit 43 and between the two is a non-return valve 44 seated at 45 so as to prevent passage of fluid from the conduit 43 to the port 25. Valve 44 is normally held on its seat by a loading spring 46. Pressure chamber 40 is in communication with the service side of valve 44 by means of ducts 47 and 48 between which is an adjustable leak controlled by a variable valve 49 screwthreaded into the end of casing 11. This leak is therefore adjustable by rotation. Alternatively, the leak may be calibrated to the required cross-section and need not necessarily be adjustable.

Rod 41 constitutes the first-mentioned plunger discussed in the earlier part of this specification. A duct 50 which at one end is in communication with the by-pass passage or line 26 is in communication at its other end with extension 36 of the by-pass chamber through an adjustable leak 51, and in piston 37 there is a restricted passage 52 opening in opposite faces of the piston so that the two portions 35, 36 of the by-pass chamber are in communication through the passage 52.

In operation, when fluid is being supplied through delivery port 25 to the hydraulic service via conduit 43, pilot valve 13 is held on its seat by means of control spring 29 and pressure fluid passes from inlet port 24 past the non-return valve 44 into the service line. Under these conditions the fluid pressure in the system on the service side of valve 44 is communicated to pressure chamber 40 via the variable valve 49 and this pressure is applied to the end of rod 41 thus loading or tending to load pilot valve 13 in opposition to its control spring 29. The same fluid pressure also acts on the end of hollow piston rod 38 which, together with piston 37, may be considered as the second-mentioned plunger referred to at the commencement of the specification. The plunger assembly 37, 38, 41, is therefore held at the top or extreme end of its stroke, that is to say, with the plunger ends removed from the pressure chamber to the full or normally maximum extent.

By-passing function (a) above

When the operation of the hydraulic service supplied through conduit 43 is completed, fluid pressure in the system beyond valve 44 will rise until cut-out pressure has been reached. This pressure is applied to the outer end of rod 41 until the opposed pressure of control spring 29 is overcome, whereupon pilot valve 13 is lifted from its seat and thus allows pressure fluid to flow into the portion 35 of the by-pass chamber in which by-pass valve 21 operates. As this portion of the chamber is in open communication through the holes in valve 21 with the inner end of extension portion 36, pressure will be transmitted to the larger piston 37 and (provided that leak 52 is sufficiently small) the piston rod 38 will be forced into pressure chamber 40. As valve 44 will prevent the fluid from escaping from the pressure chamber, movement of the piston rod 38 into the pressure chamber 40 will increase pressure on the fluid medium in that chamber and this will be transmitted to rod 41, thereby increasing the lift of pilot valve 13 and thereby causing by-pass valve 21 to be moved to uncover port 27 leading to the by-pass passage 26. This will allow fluid delivered by the pump which supplies pressure fluid to the system to be by-passed back to the supply tank.

Maintenance of pressure in service line—Function (c) above

As pilot valve 13 is held open by fluid pressure in the pressure chamber 40 acting on rod 41 in opposition to spring 29, and as pressure chamber 40 is connected to the service line via the variable valve 49 and is isolated from the by-pass circuit by non-return valve 44, it follows that pressure in the service line will always be maintained during by-passing.

Low by-pass pressure—Function (d) above

The pressure against which the service pump is operating while by-passing is the same as that which exists in the chamber in which the by-pass valve 21 works. From the preceding paragraph it will be clear that this pressure is dependent upon the difference between the areas of the piston 37 and piston rod 38 and the pressure existing in the pressure chamber acting on the end of rod 41 in opposition to spring 29 controls the opening of the by-pass valve 21 so as to maintain these associated parts in equilibrium. By suitable adjustment of the relative sizes of the piston 37 and piston rod 38 and the rate of the spring 29 the by-pass pressure may be made as low as is desired.

Smooth opening of valve—Function (e) above

After the pilot valve 13 has been lifted from its seat, further movement of by-pass valve 21 is dependent, as explained above, on movement of the piston rod 38. Such movement cannot occur without displacement of fluid in cylinder 36 and the rate of movement can therefore be regulated by adjusting the size of the restricted outlet or leak 51 from that cylinder. By controlling the rate at which the line pressure falls from the operating pressure to the by-pass pressure, smooth operation can be obtained and hydraulic shock avoided.

Cut in the service supply—Function (f) above

When pressure in the service conduit 43 falls below a predetermined value, pressure in the pressure chamber 40 also falls. Consequently, pressure on the end of rod 41 is reduced and the pilot valve seats under the influence of its control spring 29, thus returning the whole mechanism to the condition first described.

Smooth operation can be assured by adjustment of the valve 49. The rate at which fluid is displaced from pressure chamber 40 is thus controlled and hence also the rate at which the pilot valve 13 closes will also be controlled.

The piston and piston rod 37, 38 are returned to their initial position under the influence of pressure in pressure chamber 40 and fluid which remains in chamber 35 and on the corresponding side of piston 37 will pass through bleed orifice 52.

Make up of fluid losses due to leakage

The opening of the by-pass valve 21 and hence the fluid pressure in chamber 35 is dependent on the pressure in pressure chamber 40 acting on plunger 41 in opposition to control spring 29. For equilibrium the net load applied to piston 37 by pressures of fluid in the two chambers 35, 36 must be equal to the load applied to the end of piston rod 38 by pressure of fluid in chamber 40. Hence the opening of valve 21 is automatically dependent upon the balance of the above-mentioned hydraulic forces and the pressure of the control spring.

This is true independently of the position of the piston rod 38 within the limits of movement imposed by the length of the chamber 36, and it will, therefore, be apparent that pressure in chamber 40 and hence in the service line supplied via conduit 43 will be maintained even though slight leakage may occur in that part of the service system. The extent to which such fluid losses can be made up is dependent upon the limiting displacement of piston rod 38.

Figure 2 illustrates diagrammatically one typical lay-out of the entire service in which the present invention is employed. In this diagram, pump 60 is shown as drawing liquid through conduit 61 from a supply tank 162 and passing it through conduit 62 to a cut-out valve 11, which reference numeral is denoted to represent the apparatus illustrated in Figure 1. The by-pass passage 26 is shown as leading back to the tank and the service conduit 43 is shown as delivering the pressure liquid to a distributor 63 which distributes the pressure liquid to service line 64, the passages through which are controlled by selector valves diagrammatically indicated at 65.

The invention is not limited to the specific details of construction above described. For example, where a conical seating has been referred to for the pilot valve, it is to be understood that this may be replaced by any other preferred shape of seating but the term "conical" has been employed throughout the description in order to simplify the identification of the part in question. Similarly, that portion of the by-pass valve which actually controls the by-pass port may be of a form other than that described provided that it is a sliding type of valve or at least a valve, the opening of which will not take place until an initial movement has been imparted to the pilot valve sufficient to lift it from its seat just mentioned. Similarly also, the pressure chamber and the by-pass chamber may be formed of interconnected parts, and the two plungers need not be coaxial with the by-pass chamber nor with each other.

We claim:

1. A hydraulic cut-out device comprising a valve casing having an inlet, a delivery outlet and a by-pass outlet, a by-pass valve normally blocking flow from the inlet to the by-pass outlet, a piston subject to the pressure in said delivery outlet adapted to shift said valve initially, a second piston effective on displacement to increase the pressure on said first-mentioned piston, and a pilot valve actuated by said by-pass valve and controlling the admission of fluid from said inlet to one side of said second piston to cause displacement thereof.

2. A hydraulic cut-out device according to claim 1, in which the by-pass valve controls the motion of the pilot valve in such manner that the by-pass valve is opened only after initial movement of the pilot valve has admitted fluid to displace the second piston.

3. A hydraulic cut-out valve according to claim 1 wherein the second piston is coaxial with and surrounds the first-mentioned piston.

4. A hydraulic cut-out valve according to claim 1 in which the by-pass valve is reciprocable in a by-pass chamber and said second piston is movable longitudinally within an enlargement of the by-pass chamber that is coaxial with the latter.

5. A hydraulic cut-out valve according to claim 1 in which the by-pass valve is reciprocable in a by-pass chamber and said second piston is movable longitudinally within an enlargement of the by-pass chamber that is coaxial with the latter, said enlargement being connected at that end remote from the by-pass valve and towards which the piston head will move under pressure within the by-pass chamber, to the by-pass outlet through a calibrated leak.

6. A hydraulic cut-out valve according to claim 1 in which a calibrated leak is provided in the second piston.

7. A hydraulic cut-out device according to claim 1 in which fluid is supplied to the first-mentioned piston through a calibrated leak.

8. A hydraulic cut-out device comprising in combination a pressure inlet, a service-pressure outlet, a non-return valve controlling the service-pressure outlet, a by-pass passage opening into the device, a by-pass valve controlling the by-pass passage, resilient means normally closing the by-pass valve, a pressure chamber connected to the service-pressure side of the system, a plunger entering and acted upon by pressure in the pressure chamber and operatively connected with the by-pass valve a pilot valve which is hydraulically balanced with respect to the inlet and by-pass fluid and controls the passage leading from the inlet to the by-pass chamber, a yielding wall for the latter, which wall is subjected to pressure within the by-pass chamber, means operatively connecting the by-pass valve with the pilot valve whereby the by-pass valve serves, when the pilot valve is open, to connect the inlet line to the by-pass line through the by-pass chamber, the operative connection between the two valves being so arranged that the by-pass valve is opened only after initial movement of the pilot valve has admitted fluid to the by-pass chamber, and a piston which has one end within the pressure chamber and is operatively connected with the yielding wall of the by-pass chamber whereby as the latter moves under the pressure of fluid admitted to the by-pass chamber, the piston will serve to increase pressure within the pressure chamber.

9. A hydraulic cut-out device according to claim 8 in which the by-pass valve is connected mechanically with the pilot valve.

10. A hydraulic cut-out device according to claim 8, wherein the piston that is operatively connected to the yielding wall of the by-pass chamber is also operatively connected to the by-pass valve.

11. A hydraulic cut-out device according to claim 8 in which the piston that is operatively connected to the yielding wall of the by-pass chamber is also operatively connected to the pilot valve.

12. A hydraulic cut-out device according to claim 8, wherein the piston that is operatively connected to the yielding wall of the by-pass chamber is also operatively connected to both the by-pass and pilot valves.

13. A hydraulic cut-out device according to claim 8, wherein the piston that is operatively connected to the yielding wall of the by-pass chamber is also operatively connected to the by-pass valve, and is coaxial with and surrounds the plunger, which latter also enters the pressure chamber and comprises part of the pilot valve actuating means.

14. A hydraulic cut-out device according to claim 8, wherein the piston that is operatively connected to the yielding wall of the by-pass chamber is also operatively connected to the by-pass valve, and in which the yielding wall or equivalent part of the by-pass chamber comprises a piston head movable longitudinally with an enlargement of the by-pass chamber, which enlargement is coaxial with the by-pass chamber.

15. A hydraulic cut-out device according to claim 8, wherein the piston that is operatively connected to the yielding wall of the by-pass chamber is also operatively connected to the by-pass valve, and in which the yielding wall or equivalent part of the by-pass chamber comprises a piston head movable longitudinally with an enlargement of the by-pass chamber, which enlargement is coaxial with the by-pass chamber and is connected, at that end remote from the by-pass valve and towards which the piston head will move under pressure within the by-pass chamber, to the by-pass line through a calibrated leak.

16. A hydraulic cut-out device according to claim 8, wherein the piston that is operatively connected to the yielding wall of the by-pass chamber is also operatively connected to the by-pass valve, and wherein a calibrated leak is provided in the yielding wall of the by-pass chamber.

17. A hydraulic cut-out device according to claim 8 having a calibrated leak through which pressure fluid is admitted to the pressure chamber.

18. A hydraulic cut-out device according to claim 8 in which the pressure chamber is connected to the service side of the non-return valve which controls the service pressure outlet.

CYRIL ALPHONSO PUGH.
ALAN WILLIAM SAY.